(12) United States Patent
Song et al.

(10) Patent No.: US 10,551,509 B2
(45) Date of Patent: Feb. 4, 2020

(54) METHODS AND SYSTEMS FOR VEHICLE LOCALIZATION

(71) Applicant: GM GLOBAL TECHNOLOGY OPERATIONS LLC, Detroit, MI (US)

(72) Inventors: Xiaofeng F. Song, Novi, MI (US); Valor Yaldo, West Bloomfield, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 260 days.

(21) Appl. No.: 15/638,565

(22) Filed: Jun. 30, 2017

(65) Prior Publication Data

US 2019/0003847 A1      Jan. 3, 2019

(51) Int. Cl.

| | | |
|---|---|---|
| *G01S 19/48* | (2010.01) | |
| *G01C 21/36* | (2006.01) | |
| *G01C 21/30* | (2006.01) | |
| *G01S 19/40* | (2010.01) | |
| *G06K 9/00* | (2006.01) | |
| *G06K 9/62* | (2006.01) | |

(Continued)

(52) U.S. Cl.
CPC ............ *G01S 19/48* (2013.01); *G01C 21/30* (2013.01); *G01C 21/3602* (2013.01); *G01C 21/367* (2013.01); *G01C 21/3679* (2013.01); *G01S 19/40* (2013.01); *G06K 9/00798* (2013.01); *G06K 9/00818* (2013.01); *G06K 9/6215* (2013.01); *G06T 5/006* (2013.01); *G06T 7/73* (2017.01)

(58) Field of Classification Search
CPC ......... G01S 19/48; G01S 19/40; G06T 5/006; G06T 7/73; G06K 9/6215; G06K 9/00798; G06K 9/00818; G01C 21/30; G01C 21/367; G01C 21/3602; G01C 21/3679

See application file for complete search history.

(56) References Cited

U.S. PATENT DOCUMENTS

| 5,844,505 A | * | 12/1998 | Van Ryzin | ......... | G01C 21/3602 |
| | | | | | 340/988 |
| 8,442,791 B2 | * | 5/2013 | Stahlin | ................... | G01C 21/30 |
| | | | | | 701/445 |

(Continued)

OTHER PUBLICATIONS

Espacenet translation of KR20150059420A, G01C21/36, Hyun, 36 pages (Year: 2015).*

*Primary Examiner* — Dale W Hilgendorf
(74) *Attorney, Agent, or Firm* — Quinn IP Law

(57) ABSTRACT

Methods and systems for vehicle localization are disclosed. An exemplary system includes a navigation system configured to generate navigation data corresponding to a global position of the vehicle, at least one image sensor configured to capture image data of a selected roadway feature along a projected path of the vehicle, a database comprising map data corresponding to lateral and longitudinal coordinates for a plurality of roadway features along the projected path of the vehicle; and a controller, the controller configured to receive the image data, the map data, and the navigation data, calculate a first distance from the selected feature to the vehicle using the navigation data and the image data, calculate a second distance from the selected feature to the vehicle using the navigation data and the map data, and determine a localization error by comparing the first distance to the second distance.

18 Claims, 4 Drawing Sheets

(51) Int. Cl.
*G06T 5/00* (2006.01)
*G06T 7/73* (2017.01)

(56) References Cited

U.S. PATENT DOCUMENTS

| | | | |
|---|---|---|---|
| 9,342,888 B2* | 5/2016 | Menashe et al. | G06K 9/00664 |
| 10,145,692 B2* | 12/2018 | Okuyama | G01C 21/30 |
| 2007/0208507 A1* | 9/2007 | Gotoh | G01C 21/30 |
| | | | 701/414 |
| 2008/0238771 A1* | 10/2008 | Katayama et al. | G01S 19/48 |
| | | | 342/357.31 |
| 2008/0240573 A1* | 10/2008 | Nakamura et al. | |
| | | | G06K 9/00798 |
| | | | 382/190 |
| 2009/0080697 A1* | 3/2009 | Kishikawa et al. | |
| | | | G06K 9/00798 |
| | | | 382/103 |
| 2009/0228204 A1* | 9/2009 | Zavoli et al. | G01C 21/30 |
| | | | 701/532 |
| 2009/0265070 A1* | 10/2009 | Okada et al. | G01C 21/30 |
| | | | 701/70 |
| 2011/0044543 A1* | 2/2011 | Nakamura et al. | |
| | | | G06K 9/00798 |
| | | | 382/190 |
| 2012/0062414 A1* | 3/2012 | Sambongi | G01S 19/48 |
| | | | 342/357.25 |
| 2014/0232593 A1* | 8/2014 | Varoglu | G01S 19/48 |
| | | | 342/357.28 |
| 2016/0282127 A1* | 9/2016 | Goto et al. | G01C 21/30 |

\* cited by examiner

METHODS AND SYSTEMS FOR VEHICLE LOCALIZATION

INTRODUCTION

The present invention relates generally to the field of vehicles and, more specifically, to methods and systems for improved vehicle localization accuracy.

The operation of modern vehicles is becoming more automated, i.e. able to provide driving control with less and less driver intervention. Vehicle automation has been categorized into numerical levels ranging from Zero, corresponding to no automation with full human control, to Five, corresponding to full automation with no human control. Various automated driver-assistance systems, such as cruise control, adaptive cruise control, and parking assistance systems correspond to lower automation levels, while true "driverless" vehicles correspond to higher automation levels.

In order for a vehicle to navigate a variety of environments, the vehicle needs to localize itself in situations. Vehicle localization is one enabler used by autonomous driving systems to determine vehicle position relative to surrounding attributes or features. Relying on global positioning systems (GPS) and map database information can lead to localization errors if the map or GPS data contains biases or errors.

SUMMARY

Embodiments according to the present disclosure provide a number of advantages. For example, embodiments according to the present disclosure improve vehicle localization accuracy by using one or more vehicle cameras to detect a distance to an attribute, such as, for example and without limitation, a mile marker, and comparing the distance to the attribute as measured by the camera with the position of the attribute given by map or GPS data. Embodiments according to the present disclosure may thus improve vehicle localization accuracy, enable robust map matching and accurate lane determination, and provide vehicle localization determination redundancy.

In one aspect, a method for vehicle localization of a vehicle includes the steps of providing the vehicle with at least one image sensor configured to capture image data of a selected roadway feature along a projected path of the vehicle, a navigation system configured to generate navigation data corresponding to a global position of the vehicle, a database including map data corresponding to lateral and longitudinal coordinates for a plurality of roadway features along the projected path of the vehicle, and a controller in communication with the at least one vehicle sensor, the navigation system, and the map database, receiving, by the controller, the image data corresponding to the selected roadway feature, receiving, by the controller, the navigation data corresponding to the global position of the vehicle, receiving, by the controller, the map data corresponding to the selected roadway feature, calculating, by the controller, a first distance from the selected feature to the vehicle, calculating, by the controller, a second distance from the selected feature to the vehicle, determining, by the controller, a localization error by comparing the first distance to the second distance, and applying, by the controller, the localization error to the map database data to correct the position of at least one of the plurality of roadway features with respect to the position of the vehicle.

In some aspects, the selected roadway feature is a mile marker sign.

In some aspects, the method further includes determining, by the controller, if the localization error is above a predetermined value and if so, performing, by the controller, a navigation system cross check.

In some aspects, the method further includes determining, by the controller, if the localization error is above a predetermined value and if so, setting, by the controller, a navigation system diagnostic flag.

In some aspects, calculating the first distance includes calculating a distance from the mile marker sign to the vehicle using the image data and the navigation data.

In some aspects, calculating the second distance includes calculating a distance from the mile marker sign to the vehicle using the map data and the navigation data.

In another aspect, an automotive vehicle includes a vehicle body, a vehicle navigation system, a database including map data corresponding to lateral and longitudinal coordinates for a plurality of roadway features along the projected path of the vehicle, at least one vehicle sensor, and a controller in communication with the vehicle navigation system, the database, and the at least one vehicle sensor. The controller is configured to receive sensor data corresponding to the selected roadway feature, receive the navigation data corresponding to the global position of the vehicle, receive the map data corresponding to the selected roadway feature, calculate a first distance from the selected feature to the vehicle, calculate a second distance from the selected feature to the vehicle, determine a localization error by comparing the first distance to the second distance, and apply the localization error to the map data to correct the position of at least one of the plurality of roadway features with respect to the position of the vehicle.

In some aspects, the at least one sensor is an optical camera.

In some aspects, the optical camera is configured to capture image data of the selected roadway feature.

In some aspects, the selected roadway feature is a mile marker sign and the controller is further configured to analyze the mile marker sign including any text on the sign.

In some aspects, the controller is further configured to determine if the localization error is above a predetermined error and if so, performing a navigation system cross check.

In some aspects, calculating the first distance includes calculating a distance from the mile marker sign to the vehicle using the image data and the navigation data.

In some aspects, calculating the second distance includes calculating a distance from the mile marker sign to the vehicle using the map data and the navigation data.

In yet another aspect, a system for localizing a vehicle includes a navigation system configured to generate navigation data corresponding to a global position of the vehicle, at least one image sensor configured to capture image data of a selected roadway feature along a projected path of the vehicle, a database including map data corresponding to lateral and longitudinal coordinates for a plurality of roadway features along the projected path of the vehicle, and a controller in communication with the navigation system, the at least one image sensor, and the database, the controller configured to receive the image data, the map data, and the navigation data, calculate a first distance from the selected feature to the vehicle using the navigation data and the image data, calculate a second distance from the selected feature to the vehicle using the navigation data and the map data, and determine a localization error by comparing the first distance to the second distance.

In some aspects, the controller is further configured to apply the localization error to the map data to correct the position of at least one of the plurality of roadway features with respect to the position of the vehicle.

In some aspects, the at least one image sensor is an optical camera.

In some aspects, the selected roadway feature is a mile marker sign and the controller is further configured to analyze the mile marker sign including any text on the sign.

BRIEF DESCRIPTION OF THE DRAWINGS

The present disclosure will be described in conjunction with the following figures, wherein like numerals denote like elements.

Figure 1:
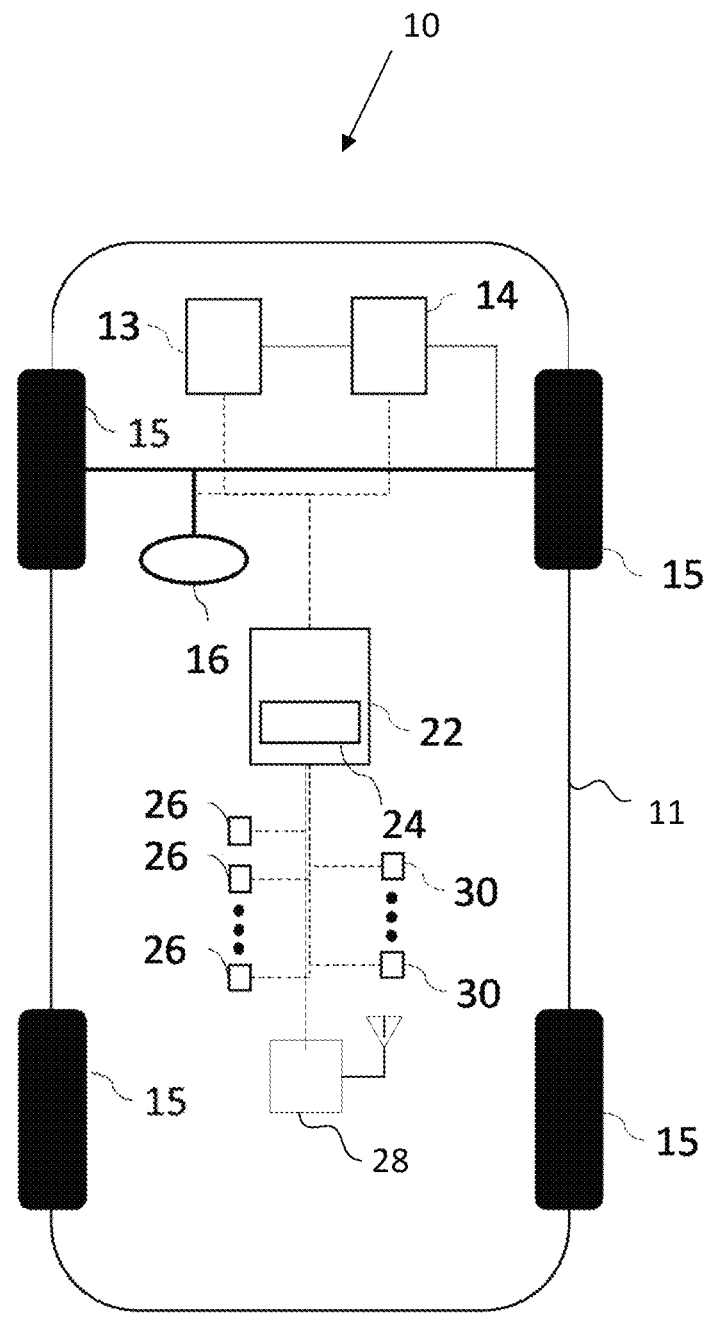
FIG. 1 is a schematic diagram of an autonomous or semi-autonomous vehicle having a vehicle localization system, according to an embodiment.

The foregoing and other features of the present disclosure will become more fully apparent from the following description and appended claims, taken in conjunction with the accompanying drawings. Understanding that these drawings depict only several embodiments in accordance with the disclosure and are not to be considered limiting of its scope, the disclosure will be described with additional specificity and detail through the use of the accompanying drawings. Any dimensions disclosed in the drawings or elsewhere herein are for the purpose of illustration only.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Certain terminology may be used in the following description for the purpose of reference only, and thus are not intended to be limiting. For example, terms such as "above" and "below" refer to directions in the drawings to which reference is made. Terms such as "front," "back," "left," "right," "rear," and "side" describe the orientation and/or location of portions of the components or elements within a consistent but arbitrary frame of reference which is made clear by reference to the text and the associated drawings describing the components or elements under discussion. Moreover, terms such as "first," "second," "third," and so on may be used to describe separate components. Such terminology may include the words specifically mentioned above, derivatives thereof, and words of similar import.

Accurate host vehicle localization is an important aspect of autonomous vehicle control. In many instances, the automated driving assistance system (ADAS) of the vehicle needs to know which lane the vehicle is in to determine the control signals to send to the various actuators controlling steering, throttle, braking, etc. For example, if a vehicle is in the right hand lane of a roadway, the controller may need to decide whether to direct the vehicle to continue forward or make a curve or turn. If the vehicle position as determined by a GPS navigation system "jumps" and incorrectly localizes the vehicle in the wrong lane, the ADAS will not have complete and accurate information to control the vehicle. Using the methods and algorithms proposed herein, using a visible object whose position can be determined from both map database data and visual data, the vehicle controller can accurately localize the vehicle, including determining the lateral position of the vehicle, that is, the vehicle's current lane of travel.

FIG. 1 schematically illustrates an automotive vehicle 10 according to the present disclosure. The vehicle 10 generally includes a body 11 and wheels 15. The body 11 encloses the other components of the vehicle 10. The wheels 15 are each rotationally coupled to the body 11 near a respective corner of the body 11. The vehicle 10 is depicted in the illustrated embodiment as a passenger car, but it should be appreciated that any other vehicle, including motorcycles, trucks, sport utility vehicles (SUVs), or recreational vehicles (RVs), etc., can also be used.

The vehicle 10 includes a propulsion system 13, which may in various embodiments include an internal combustion engine, an electric machine such as a traction motor, and/or a fuel cell propulsion system. The vehicle 10 also includes a transmission 14 configured to transmit power from the propulsion system 13 to the plurality of vehicle wheels 15 according to selectable speed ratios. According to various embodiments, the transmission 14 may include a step-ratio automatic transmission, a continuously-variable transmission, or other appropriate transmission. The vehicle 10 additionally includes wheel brakes (not shown) configured to provide braking torque to the vehicle wheels 15. The wheel brakes may, in various embodiments, include friction brakes, a regenerative braking system such as an electric machine, and/or other appropriate braking systems. The vehicle 10 additionally includes a steering system 16. While depicted as including a steering wheel and steering column for illustrative purposes, in some embodiments, the steering system 16 may not include a steering wheel.

In various embodiments, the vehicle 10 also includes a navigation system 28 configured to provide location information in the form of GPS coordinates (longitude, latitude, and altitude/elevation) to a controller 22. In some embodiments, the navigation system 28 may be a Global Navigation Satellite System (GNSS) configured to communicate with global navigation satellites to provide autonomous geo-spatial positioning of the vehicle 10. In the illustrated embodiment, the navigation system 28 includes an antenna electrically connected to a receiver.

With further reference to FIG. 1, the vehicle 10 also includes a plurality of sensors 26 configured to measure and capture data on one or more vehicle characteristics, including but not limited to vehicle speed, vehicle heading, and ambient light level conditions. In the illustrated embodiment, the sensors 26 include, but are not limited to, an accelerometer, a speed sensor, a heading sensor, gyroscope, steering angle sensor, or other sensors that sense observable conditions of the vehicle or the environment surrounding the vehicle and may include RADAR, LIDAR, optical cameras, thermal cameras, ultrasonic sensors, infrared sensors, light level detection sensors, and/or additional sensors as appropriate. In some embodiments, the vehicle 10 also includes a plurality of actuators 30 configured to receive control commands to control steering, shifting, throttle, braking or other aspects of the vehicle 10.

The vehicle 10 includes at least one controller 22. While depicted as a single unit for illustrative purposes, the controller 22 may additionally include one or more other controllers, collectively referred to as a "controller." The controller 22 may include a microprocessor or central processing unit (CPU) or graphical processing unit (GPU) in communication with various types of computer readable storage devices or media. Computer readable storage devices or media may include volatile and nonvolatile storage in read-only memory (ROM), random-access memory (RAM), and keep-alive memory (KAM), for example. KAM is a persistent or non-volatile memory that may be used to store various operating variables while the CPU is powered down. Computer-readable storage devices or media may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the controller 22 in controlling the vehicle.

Figure 2:
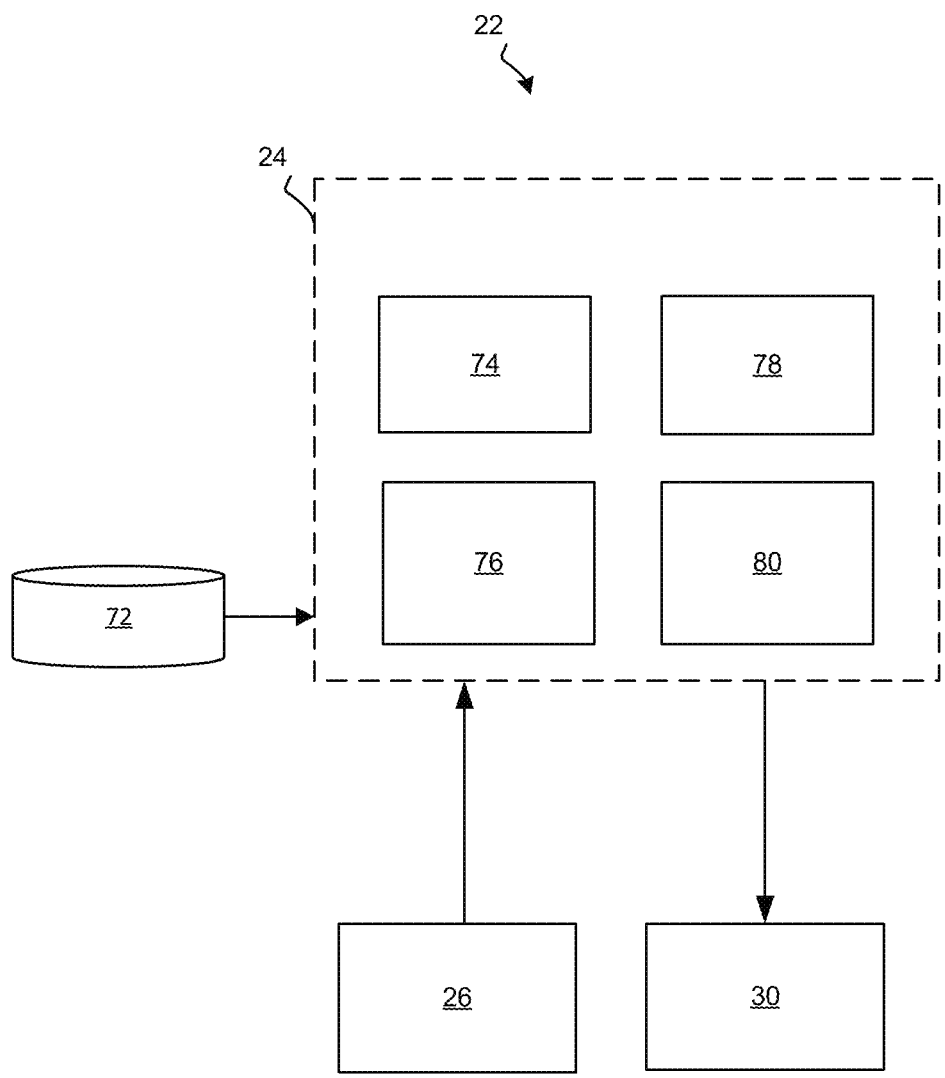
FIG. 2 is a schematic block diagram of a vehicle localization system for a vehicle, such as the vehicle of FIG. 1, according to an embodiment.

In accordance with various embodiments, controller 22 implements an autonomous driving system (ADS) 24 as shown in FIGS. 1 and 2. That is, suitable software and/or hardware components of controller 22 (e.g., a processor and a computer-readable storage device) are utilized to provide an autonomous driving system 24 that is used in conjunction with vehicle 10.

In various embodiments, the instructions of the autonomous driving system 24 may be organized by function or system. For example, as shown in FIG. 2, the autonomous driving system 24 can include a sensor fusion system 74, a positioning system 76, a guidance system 78 in communication with the navigation system 28, and a vehicle control system 80. As can be appreciated, in various embodiments, the instructions may be organized into any number of systems (e.g., combined, further partitioned, etc.) as the disclosure is not limited to the present examples.

In various embodiments, the sensor fusion system 74 synthesizes and processes sensor data and predicts the presence, location, classification, and/or path of objects and features of the environment of the vehicle 10. In various embodiments, the sensor fusion system 74 can incorporate information from multiple sensors, including but not limited to cameras, lidars, radars, and/or any number of other types of sensors.

The positioning system 76 processes sensor data along with other data to determine a position (e.g., a local position relative to a map, an exact position relative to lane of a road, vehicle heading, velocity, etc.) of the vehicle 10 relative to the environment. In some embodiments, the positioning system 76 includes a vehicle localization module to calculate the vehicle's position. The guidance system 78 processes sensor data along with other data to determine a path for the vehicle 10 to follow. The vehicle control system 80 generates control signals for controlling the vehicle 10 according to the determined path.

In various embodiments, the controller 22 implements machine learning techniques to assist the functionality of the controller 22, such as feature detection/classification, obstruction mitigation, route traversal, mapping, sensor integration, ground-truth determination, and the like.

As shown in FIG. 2, the controller 22 receives sensor data from one or more of the sensors 26 as well as map data from a map database 72. After analyzing and processing the sensor data by the various systems of the ADAS 24 discussed herein, the controller 22 generates one or more control signals transmitted to the one or more actuators 30.

Using at least one camera, a map database, and objects that are viewable by the camera and have known positions in the map data, a vehicle localization algorithm as discussed herein can determine the vehicle's position and provide redundancy to the GPS vehicle position or localization determination. Redundant methods to determine vehicle localization are especially helpful as the vehicle negotiates various road features such as, for example and without limitation, bridges and tunnels. In some instances, GPS accuracy in determining the vehicle's position when the vehicle is negotiating these features can vary up to 2 meters. Additionally, vehicle localization algorithms as discussed herein are also beneficial in determining the vehicle's lane of travel, or the host vehicle lane. For multi-lane roadways with multiple entry and exit points, accurate determination of the vehicle's lane position is useful to determine the control strategy for the vehicle, including whether the vehicle is in the correct lane to continue along the roadway or whether the vehicle needs to change lanes to exit the roadway, depending on the planned vehicle trajectory.

Figure 3:
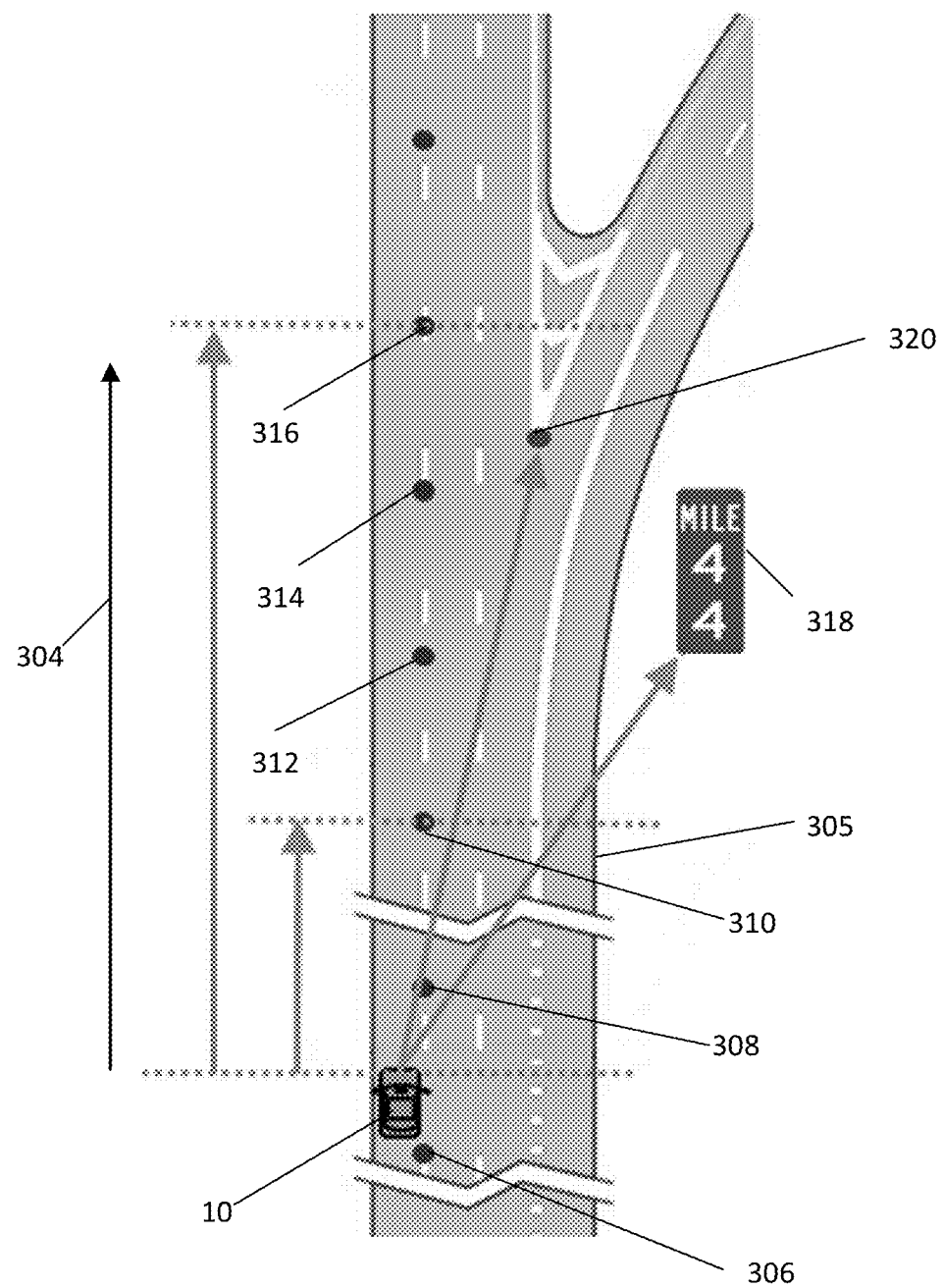
FIG. 3 is schematic diagram of a vehicle traveling on a roadway with features identified using both a vehicle camera and a GPS map database for use in vehicle localization calculations, according to an embodiment.

FIG. 3 schematically illustrates the vehicle 10 traveling along a road in a direction of travel 304. A plurality of waypoints 306, 308, 310, 312, 314, 316 represent a planned vehicle trajectory. The vehicle 10 is equipped with at least one camera, one of the sensors 26, configured to capture an image of the environment in front of, or in advance of, the vehicle 10. The camera provides image data of an area ahead of the vehicle 10 to the controller 22.

The image data generated by the one or more cameras is used by the controller 22 to determine an estimate of the location of an attribute or feature, such as a mile marker signpost adjacent to the roadway. As shown in FIG. 3, the mile marker signpost 318 is located adjacent to the roadway 305. It is known that distances to a feature in an image can be calculated using the features of the camera and the image data captured by the camera including but not limited to focal length, pixel size, image sensor size, etc. Using the image data captured by the camera, a position of the mile marker, $mm_{cam}$ (x, y) is determined by the vehicle localization module of the positioning system 76, where x and y indicate the position of the mile marker in a vehicle reference frame.

In some embodiments, the map database 72 includes data on the position of various attributes or features, including mile markers and roadway split points, for example and without limitation. A roadway split point, such as the point 320 shown in FIG. 3, is defined as a point in a roadway where one or more lanes split, or diverge, from the original roadway, such as at a highway exit. The attributes are typically described in relation to the waypoints of a planned vehicle trajectory.

Vehicle localization is based on the current position of the vehicle 10 along the road. Many of the roadway attributes are described in the map database 72 as longitudinally offset relative to a starting trajectory point for that current road segment. The distance along the road relative to the start of the current road segment is therefore an important variable in the vehicle localization determination. If the vehicle localization is determined incorrectly, then the positions of attributes that are defined relative to the vehicle localization will also be wrong. The methods and algorithms disclosed herein use an object that has a coordinate position in the map database 72 and which can be reliably detected by onboard sensor to provide an independent method to determine vehicle localization.

Typically, when the controller 22 retrieves nearby roadway attributes from the map database 72, such as the split point 320, for example and without limitation, few, if any, of the attributes can be seen by the camera. In other words, the position of the attributes cannot be validated and fused together accurately with image data captured by the camera. Embodiments of the algorithms discussed herein fuse image data from the camera with attribute position information from the map database.

As the vehicle 10 travels along the roadway, the sensors 26, including one or more cameras, capture image data that includes information about the lane markers of the roadway. The camera 26 may detect the lane markers changing direction to indicating curving lanes or an exit, but this visual determination may not be accurate. To more accurately determine the vehicle's position on the roadway, the methods described herein identify an attribute or object that is both represented in the map database 72 and visible to/detectable by the camera 26 to verify a vehicle localization determination. Mile marker signs are commonly available along highways and freeways. Using image data from the camera 26, the controller 22 can identify whether an object along the road is a mile marker, decipher the numbers on the mile marker, and report the location of the mile marker relative to the vehicle in (x, y) coordinates of the vehicle reference frame. Each mile marker in the map database is typically identified with latitude and longitude coordinates. Therefore, using the image data captured by the camera 26 and the map database data corresponding to the identified mile marker, the vehicle's position can more accurately be determined.

The locations of features such as mile markers are often identified in GPS and map data. The vehicle localization module of the positioning system 76 determines the position of the mile marker, $mm_{db}$(lat, lon), where lat is the latitudinal position and lon is the longitudinal position of the mile marker from map data acquired from the database 72. Using the navigation system 28 of the vehicle 10, a host vehicle position $hv_{gps}$(lat, lon) is determined by the vehicle localization module of the positioning system 76, where lat is the latitudinal position and lon is the longitudinal position of the vehicle from the navigation data.

Using map data acquired from the database 72, along with vehicle GPS data, a distance from an attribute to the vehicle expressed in coordinates of the host vehicle reference frame is:

$$D_{attr\ to\ hv}(x,y) = att_{db}(lat,lon) - hv_{gps}(lat,lon)$$

Where:
$att_{db}$(lat, lon) is the latitude and longitude coordinates of the attribute from the map database data; and $hv_{gps}$(lat, lon) is the latitude and longitude coordinates of the vehicle 10 from vehicle GPS data acquired from the navigation system 28.

Expressed specifically for an observable object, such as a mile marker, the distance from the mile marker to the vehicle expressed in coordinates of the host vehicle reference frame is:

$$D_{mm\ to\ hv}(x,y) = mm_{db}(lat,lon) - hv_{gps}(lat,lon)$$

Where:
$mm_{db}$(lat, lon) is the latitude and longitude coordinates of the mile marker from the map database data; and $hv_{gps}$(lat, ion) is the latitude and longitude coordinates of the vehicle 10 from vehicle GPS data acquired from the navigation system 28.

If the position of the mile marker is accurately expressed in the map data and the vehicle's position as indicated by the navigation data is also accurate, then the GPS position of the vehicle plus the distance from the vehicle to the mile marker calculated by the vehicle localization module using the image data should equal the position of the feature acquired from the map data of the map database 72, that is, $hv_{gps}$(lat, lon)+$mm_{cam}$(x, y) should equal $mm_{db}$(lat, lon). However, inaccuracies in either the map data or the GPS navigation data can lead to vehicle localization errors, which can affect the other systems of the ADAS 24.

To obtain the localization error, the distance from the vehicle to the attribute or feature is calculated from the image data captured by the camera and compared to the distance from the attribute or feature to the vehicle as calculated from the map data.

The localization error can be expressed as:

$$e_{hv}(x,y) = D_{cam}(x,y) - D_{mm\ to\ bb}(x,y)$$

Where
$e_{hv}$(x, y) is the localization error expressed in coordinates of the host vehicle reference frame;

$D_{cam}$(x, y) is the distance from the feature, such as a mile marker, to the vehicle, calculated from the image data captured by the camera; and $D_{mm\ to\ hv}$(x, y) is the distance from the mile maker to the host vehicle obtained from map database data.

When the vehicle sensors are accurately calibrated, the measurement from the vehicle 10 to the mile marker using data obtained from the camera's image data is given higher credibility because the image data is live and current. Once the localization error, $e_{hv}$(x, y) is determined, the error can be used to correct the map database data for other attributes' relative distance to the vehicle. Other attributes include, for example and without limitation, roadway curvature points or split points. Applying the error as discussed in further detail herein improves localization accuracy.

Adjusting the distance of an attribute to the host vehicle using the calculated localization error $e_{hv}$(x, y) is expressed as:

$$D_{attr\ to\ hv}'(x,y) = D_{attr\ to\ hv}(x,y) - e_{hv}(x,y)$$

Where
$D'_{attr\ to\ hv}$(x, y) is the adjusted distance from the attribute to the host vehicle expressed in coordinates of the host vehicle reference frame; and $D_{attr\ to\ hv}$(x, y) is the distance from the attribute to the host vehicle obtained from map database data and expressed in coordinates of the host vehicle reference frame; and $e_{hv}$(x, y) is the localization error.

In some embodiments, if the localization error is consistently above a predetermined threshold error value, the localization error can be used as a system cross check or diagnostic to determine if the navigation system 28 is working correctly, for example and without limitation.

Figure 4:
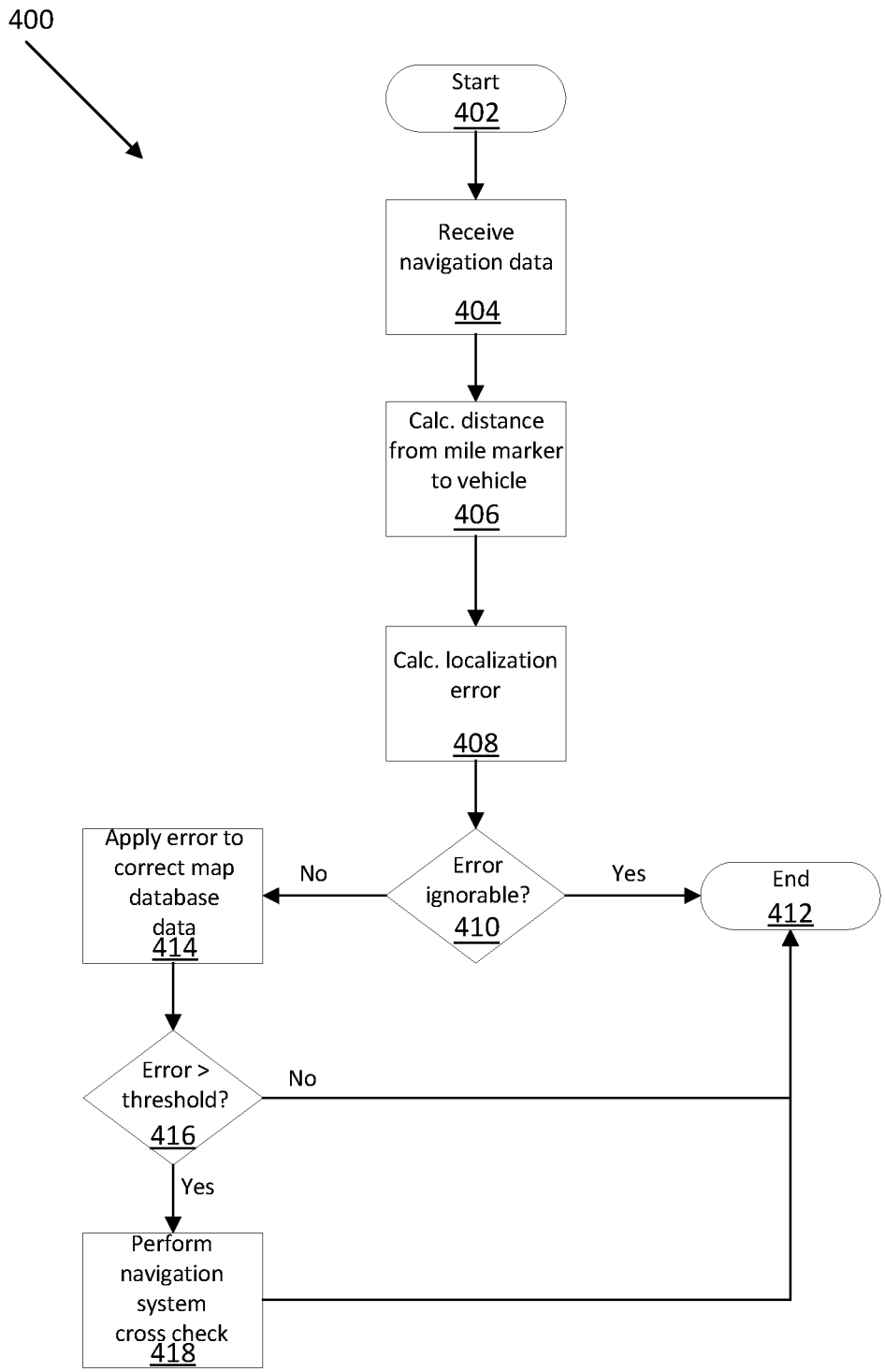
FIG. 4 is a flow chart of a method for vehicle localization, according to an embodiment.

As discussed herein, map data, camera image data, and navigation data are used to improve host vehicle localization accuracy. FIG. 4 is a flow chart of a method 400 illustrating the determination of a localization error used to improve host vehicle localization accuracy, enable robust map matching and accurate host lane determination, and provide localization redundancy. The navigation data is obtained from the navigation system 28 and the map data is obtained from one or more map databases 72 associated with the controller 22. The method 400 can be utilized in connection with the vehicle 10, the controller 22, and the various modules of the ADAS 24, in accordance with exemplary embodiments. The order of operation of the method 400 is not limited to the sequential execution as illustrated in FIG. 4, but may be performed in one or more varying orders as applicable and in accordance with the present disclosure.

As shown in FIG. 4, starting at 402, the method 400 proceeds to step 404. At 404, the sensor fusion system 74 of the ADAS 24 receives navigation data from the navigation system 28 and image data from one or more cameras 26. The navigation data includes GPS data representing the vehicle location. The image data includes data acquired from one or more cameras 26 of a detectable object or feature, such as a mile marker. In some embodiments, the sensor fusion system 74 further analyzes the image data to identify the feature, such as a mile marker, by interpreting the text of the sign. The analyzed and processed sensor data is transmitted to the positioning system 76 of the controller 22. The sensor data, along with the map database data received from the database 72, provides the positioning system 76 with information on the location of the vehicle 10, the projected path of the vehicle 10 along a roadway, and upcoming attributes or features along the roadway.

Next, at 406, the positioning system 76 uses the processed sensor data, navigation data, and map data to calculate the distance from the mile marker to the host vehicle. In some embodiments, the interpreted text is also used to locate the positions of the mile marker and the vehicle 10. A first distance is calculated using the image data from the camera 26 and the position of the vehicle 10 from the navigation data. A second distance is calculated using the position of the vehicle 10 from the navigation data and the position of the mile marker from the map data from the database 72. The method then proceeds to 408.

At 408, the positioning system 76 calculates the localization error as discussed herein, by comparing the first and second distances. At 410, if the localization error is zero or within a predetermined range of values such that the error can be ignored by the ADAS 24, the method 400 proceeds to 412 and ends.

However, if the localization error is non-zero, the method 400 proceeds to 414. At 414, the positioning system 76 applies the localization error to correct the map database data for other attributes' relative distance to the vehicle. Other attributes include, for example and without limitation, roadway curvature points or split points.

Next, at 416, if the localization error is greater than or equal to a predetermined threshold value, the method 400 proceeds to 418 and the controller 22 performs a navigation system cross check and/or sets a diagnostic flag indicating a possible issue with the vehicle navigation system, for example and without limitation. In some embodiments, the controller 22 performs a navigation system cross check and/or sets a diagnostic flag if the localization error is above the predetermined threshold value after a predetermined number of calculations or after a predetermined time duration. The method 400 then proceeds to 412 and ends.

However, if the localization error is not greater than the predetermined threshold value, the method 400 proceeds to block 412 and ends.

It should be emphasized that many variations and modifications may be made to the herein-described embodiments, the elements of which are to be understood as being among other acceptable examples. All such modifications and variations are intended to be included herein within the scope of this disclosure and protected by the following claims. Moreover, any of the steps described herein can be performed simultaneously or in an order different from the steps as ordered herein. Moreover, as should be apparent, the features and attributes of the specific embodiments disclosed herein may be combined in different ways to form additional embodiments, all of which fall within the scope of the present disclosure.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment.

Moreover, the following terminology may have been used herein. The singular forms "a," "an," and "the" include plural referents unless the context clearly dictates otherwise. Thus, for example, reference to an item includes reference to one or more items. The term "ones" refers to one, two, or more, and generally applies to the selection of some or all of a quantity. The term "plurality" refers to two or more of an item. The term "about" or "approximately" means that quantities, dimensions, sizes, formulations, parameters, shapes and other characteristics need not be exact, but may be approximated and/or larger or smaller, as desired, reflecting acceptable tolerances, conversion factors, rounding off, measurement error and the like and other factors known to those of skill in the art. The term "substantially" means that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

Numerical data may be expressed or presented herein in a range format. It is to be understood that such a range format is used merely for convenience and brevity and thus should be interpreted flexibly to include not only the numerical values explicitly recited as the limits of the range, but also interpreted to include all of the individual numerical values or sub-ranges encompassed within that range as if each numerical value and sub-range is explicitly recited. As an illustration, a numerical range of "about 1 to 5" should be interpreted to include not only the explicitly recited values of about 1 to about 5, but should also be interpreted to also include individual values and sub-ranges within the indicated range. Thus, included in this numerical range are individual values such as 2, 3 and 4 and sub-ranges such as "about 1 to about 3," "about 2 to about 4" and "about 3 to about 5," "1 to 3," "2 to 4," "3 to 5," etc. This same principle applies to ranges reciting only one numerical value (e.g., "greater than about 1") and should apply regardless of the breadth of the range or the characteristics being described. A plurality of items may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. Furthermore, where the terms "and" and "or" are used in conjunction with a list of items, they are to be interpreted broadly, in that any one or more of the listed items may be used alone or in combination with other listed items. The term "alternatively" refers to selection of one of two or more alternatives, and is not intended to limit the selection to only those listed alternatives or to only one of the listed alternatives at a time, unless the context clearly indicates otherwise.

The processes, methods, or algorithms disclosed herein can be deliverable to/implemented by a processing device, controller, or computer, which can include any existing programmable electronic control unit or dedicated electronic control unit. Similarly, the processes, methods, or algorithms can be stored as data and instructions executable by a controller or computer in many forms including, but not limited to, information permanently stored on non-writable storage media such as ROM devices and information alterably stored on writeable storage media such as floppy disks, magnetic tapes, CDs, RAM devices, and other magnetic and optical media. The processes, methods, or algorithms can also be implemented in a software executable object. Alternatively, the processes, methods, or algorithms can be embodied in whole or in part using suitable hardware components, such as Application Specific Integrated Circuits (ASICs), Field-Programmable Gate Arrays (FPGAs), state machines, controllers or other hardware components or devices, or a combination of hardware, software and firmware components. Such example devices may be on-board as part of a vehicle computing system or be located off-board and conduct remote communication with devices on one or more vehicles.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further exemplary aspects of the present disclosure that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. A method for vehicle localization of a vehicle, the method comprising:
   providing the vehicle with at least one image sensor configured to capture image data of a selected roadway feature of a plurality of roadway features along a projected path of the vehicle, a navigation system configured to generate navigation data corresponding to a global position of the vehicle, a database comprising map data corresponding to lateral and longitudinal coordinates for the plurality of roadway features along the projected path of the vehicle, and a controller in communication with the at least one image sensor, the navigation system, and the map database;
   receiving, by the controller, the image data corresponding to the selected roadway feature;
   receiving, by the controller, the navigation data corresponding to the global position of the vehicle;
   receiving, by the controller, the map data corresponding to the selected roadway feature;
   calculating, by the controller, a first distance from the selected feature to the vehicle, wherein calculating the first distance comprises calculating a distance from the selected feature to the vehicle using the image data and the navigation data;
   calculating, by the controller, a second distance from the selected feature to the vehicle, wherein calculating the second distance comprises calculating a distance from the selected feature to the vehicle using the map data and the navigation data;
   determining, by the controller, a vehicle localization error by comparing the first distance to the second distance;
   applying, by the controller, the vehicle localization error to the map database data to correct the position of at least one of the plurality of roadway features with respect to the position of the vehicle; and
   determining, by the controller, an updated vehicle position from the vehicle localization error, the updated vehicle position including a lateral position of the vehicle.

2. The method of claim 1, wherein the selected roadway feature is a mile marker sign.

3. The method of claim 2, further comprising determining, by the controller, if the vehicle localization error is above a predetermined value and if so, performing, by the controller, a navigation system cross check.

4. The method of claim 2, further comprising determining, by the controller, if the vehicle localization error is above a predetermined value and if so, setting, by the controller, a navigation system diagnostic flag.

5. The method of claim 2, wherein calculating the first distance comprises calculating a distance from the mile marker sign to the vehicle using the image data and the navigation data.

6. The method of claim 5, wherein calculating the second distance comprises calculating a distance from the mile marker sign to the vehicle using the map data and the navigation data.

7. The method of claim 1, wherein the vehicle localization error is expressed as $e_{hv}(x, y) = D_{cam}(x, y) - D_{mm\ to\ hv}(x, y)$, where $e_{hv}(x, y)$ is the vehicle localization error expressed in coordinates of a reference frame of the vehicle, $D_{cam}(x, y)$ is the first distance from the selected feature to the vehicle calculated from the image data and the navigation data, and $D_{mm\ to\ hv}(x, y)$ is the second distance from the selected feature to the vehicle obtained from the map data and the navigation data.

8. An automotive vehicle, comprising:
a vehicle body;
a vehicle navigation system;
a database comprising map data corresponding to lateral and longitudinal coordinates for a plurality of roadway features along a projected path of the vehicle;
at least one vehicle sensor; and
a controller in communication with the vehicle navigation system, the database, and the at least one vehicle sensor, the controller configured to
receive sensor data corresponding to a selected roadway feature of the plurality of roadway features;
receive the navigation data corresponding to a global position of the vehicle;
receive the map data corresponding to the selected roadway feature;
calculate a first distance from the selected roadway feature to the vehicle using the sensor data and the navigation data;
calculate a second distance from the selected roadway feature to the vehicle using the map data and the navigation data;
determine a vehicle localization error by comparing the first distance to the second distance;
apply the vehicle localization error to the map data to correct the position of at least one of the plurality of roadway features with respect to the position of the vehicle; and
determine an updated vehicle position from the vehicle localization error, the updated vehicle position including a lateral position of the vehicle.

9. The automotive vehicle of claim 8, wherein the at least one sensor is an optical camera.

10. The automotive vehicle of claim 9, wherein the optical camera is configured to capture image data of the selected roadway feature.

11. The automotive vehicle of claim 10, wherein the selected roadway feature is a mile marker sign and the controller is further configured to analyze the mile marker sign including any text on the sign.

12. The automotive vehicle of claim 11, wherein calculating the first distance comprises calculating a distance from the mile marker sign to the vehicle using the image data and the navigation data.

13. The automotive vehicle of claim 12, wherein calculating the second distance comprises calculating a distance from the mile marker sign to the vehicle using the map data and the navigation data.

14. The automotive vehicle of claim 8, wherein the controller is further configured to determine if the vehicle localization error is above a predetermined error and if so, performing a navigation system cross check.

15. A system for localizing a vehicle, comprising:
a navigation system configured to generate navigation data corresponding to a global position of the vehicle;
at least one image sensor configured to capture image data of a selected roadway feature along a projected path of the vehicle;
a database comprising map data corresponding to lateral and longitudinal coordinates for a plurality of roadway features along the projected path of the vehicle, the plurality of roadway features including the selected roadway feature; and
a controller in communication with the navigation system, the at least one image sensor, and the database, the controller configured to receive the image data, the map data, and the navigation data, calculate a first distance from the selected roadway feature to the vehicle using the navigation data and the image data, calculate a second distance from the selected roadway feature to the vehicle using the navigation data and the map data, and determine a vehicle localization error by comparing the first distance to the second distance, and determine an updated vehicle position from the vehicle localization error, the updated vehicle position including a lateral position of the vehicle.

16. The system of claim 15, wherein the controller is further configured to apply the vehicle localization error to the map data to correct the position of at least one of the plurality of roadway features with respect to the position of the vehicle.

17. The system of claim 15, wherein the at least one image sensor is an optical camera.

18. The system of claim 15, wherein the selected roadway feature is a mile marker sign and the controller is further configured to analyze the mile marker sign including any text on the sign.

* * * * *